Sept. 17, 1935.　　　　C. W. HUBERT　　　　2,014,683
CATHEAD CONTROL MECHANISM
Filed Oct. 16, 1934　　　3 Sheets-Sheet 1

Inventor
C. W. Hubert
By Clarence A. O'Brien
Attorney

Sept. 17, 1935.　　　C. W. HUBERT　　　2,014,683
CATHEAD CONTROL MECHANISM
Filed Oct. 16, 1934　　　3 Sheets-Sheet 2
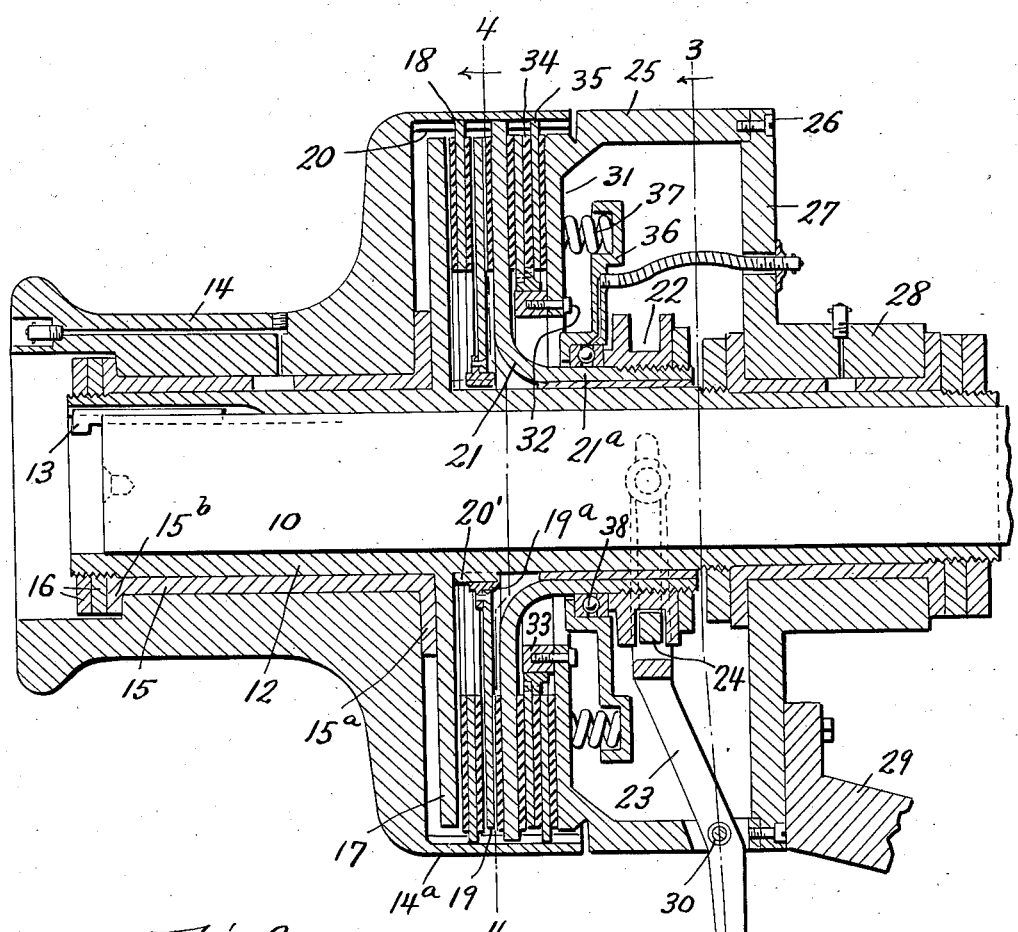
Fig. 2.
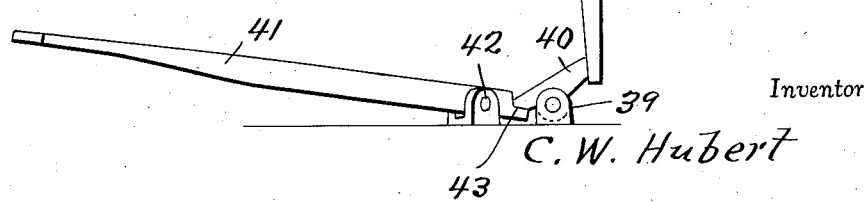
Inventor
C. W. Hubert
By Clarence A. O'Brien
Attorney Patented Sept. 17, 1935

2,014,683

UNITED STATES PATENT OFFICE 2,014,683

CATHEAD CONTROL MECHANISM

Clark W. Hubert, Childress, Tex.

Application October 16, 1934, Serial No. 748,543

4 Claims. (Cl. 192—18)

This invention relates to load handling apparatus and more particularly to what is commonly known as a cathead. An object of the invention is to provide in an apparatus of this character substantially automatic safety means for the protection of the operator in the event the hands of the operator are fouled in the rope on the cathead.

In accordance with the present invention an improved brake and operating means therefor are provided and adapted to be controlled by the foot in such a manner that in the event of the fouling of the operator's hands in the rope of the cathead, as above suggested, the foot of the operator will be jerked out of engagement with the brake controlling means so that the brake will automatically operate to apply braking action to the drum and thereby prevent further operation of the cathead.

This invention together with its objects and advantages will be better understood from a study of the following description taken in connection with the accompanying drawings wherein:

Figure 2 is a fragmentary detail sectional view therethrough.

Figure 3:
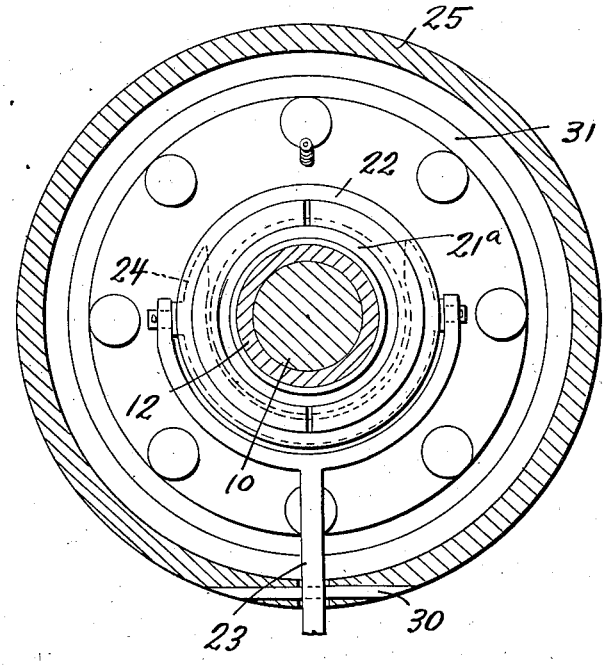
Figure 4:
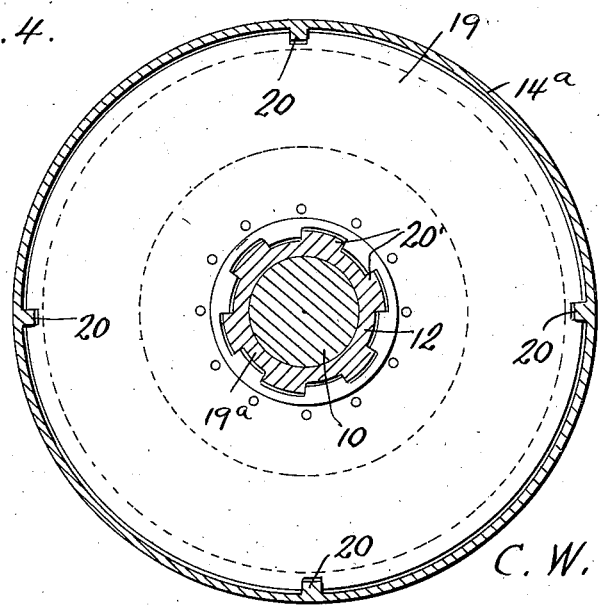

Figures 3 and 4 are detail views taken substantially on the lines 3—3 and 4—4 respectively of Figure 2.

Figure 1:
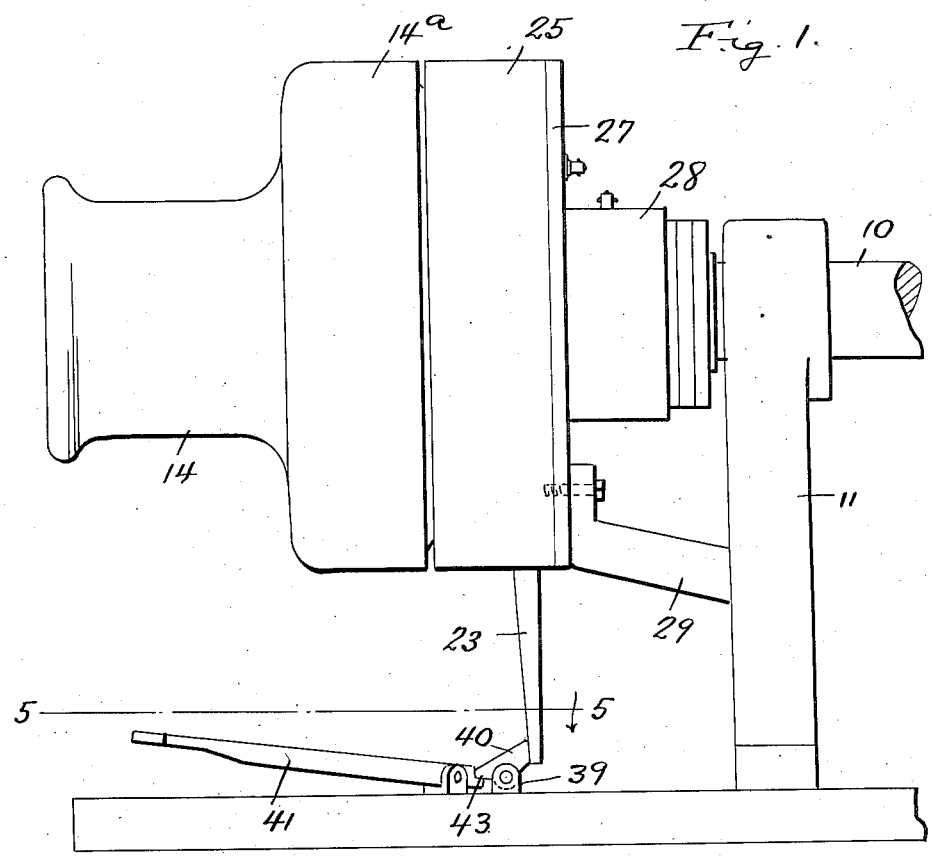
Figure 1 is a side elevational view of a cathead embodying the features of the present invention.
Figure 5:
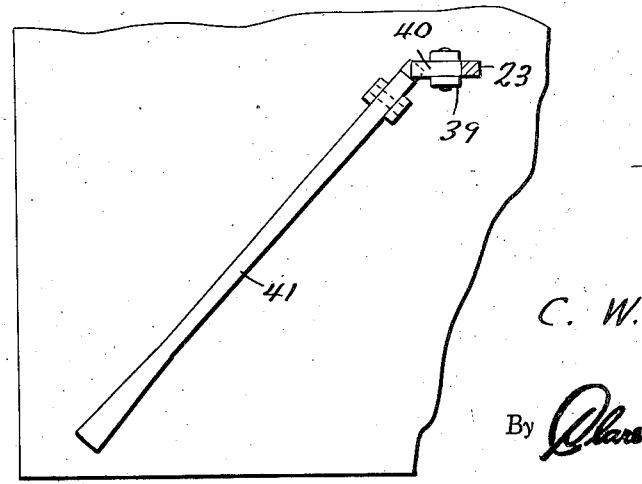

Figure 5 is a detail view taken substantially on the line 5—5 of Figure 1.

Referring to the drawings by reference numerals it will be seen that the numeral 10 indicates a line or power shaft which is suitably mounted in bearings in upright supports 11, and which is driven from any suitable source of power.

On one end of the shaft 10 is a sleeve or hub 12, and the shaft 10 and sleeve or hub 12 have mating ways with which is engaged a key 13 so that the hub or sleeve 12 is secured to the shaft 10 to rotate therewith. On one end of the sleeve or hub 12 is the cathead 14 that has an integral cylindrical portion 14a at one end. Interposed between the cathead 14 and the sleeve or hub 12 is a suitable bushing 15. Bushing 15 is flanged at one end as at 15a to engage the cathead internally of the cylindrical part 14a thereof and is also provided with a flange 15b at an opposite end against which are threaded home lock nuts 16 on one end of the sleeve 12. Internally of the part 14a of the cathead the sleeve 12 is provided with an integral clutch disk 17. A sliding clutch disk 18 is arranged between the clutch disk 17 and a third clutch disk 19. On its outer circular head the clutch disk 18 is provided with notches or ways in which are engaged the keys 20 provided internally of the part 14a of the cathead. The clutch member 19 is secured to a hub 19a provided internally with ways in which are engaged the keys 20' provided on the hub or sleeve 12. It will thus be seen that when the clutch disk 19 is moved toward the left in Figure 2 to frictionally engage the clutch disk 17 with the clutch disk 18 pressed against the clutch disk 17 that the hub 12 is placed in driving engagement with the cathead 14 so that the latter will rotate with the shaft 10.

For shifting the clutch disk to effect the placing of the cathead 14 in driving engagement with the shaft 10 there is provided a disk 21 formed integrally with the hub 21a slidably engaged on the hub or sleeve 12 and having in its outer circular edge ways in which the keys 20 are engaged. Threaded on the hub 21a is grooved collar 22. A shifting fork 23 has the legs thereof pivoted to a substantially U-shaped member 24 that is arranged within the groove of the collar 22, and the fork 23 being pivoted it will be apparent that a swinging movement of the fork 23 will cause the collar 22 and the disk 21 to move lengthwise of the shaft 10.

The collar 22 and hub of disk 21 are housed within a hollow casing or drum 25 bolted or otherwise secured at 26 to a fixed plate 27 equipped with a hub and bushing assembly 28 through which the shaft 10 extends. The disk or plate 27 is supported in fixed position through the medium of a bracket 29 mounted on the standard 11. The casing or drum 25 is provided with an opening through which the fork 23 extends and arranged in the opening is a pivot 30 for the fork 23.

At the side thereof opposite to the disk 27 the drum or casing 25 is reduced diametrically and is provided with an integral apertured wall 31 to the outer side of which is secured as at 32 a ring like member 33. Secured to the member 33 to rotate therewith, and also to slide axially thereof is a brake disk 34 between which and the friction provided surface of the plate or end wall 31 is a friction disk 35 the outer edges of which are provided with ways with which the keys 20 are engaged. It will thus be seen that by manipulating the fork 33 to shift the disk 21 to the right in Figure 1 disks 34 and 35 will be mounted against one another and against the plate or wall 31 of the fixed drum 25, and by reason of the disk 35 being engaged, in a manner just described, with the cathead 14 a braking action will be applied to the cathead while at the same time disk 18 will be relieved thus interrupting the drive connection between the shaft 10 and the cathead 14.

The disk 21 is normally urged to the right in Figure 2 through the medium of a shifter plate 36 between which and the wall 31 of the drum 35 are arranged in a circular series springs 37. The shifter plate 36 is provided with a hollow hub in which is located a thrust bearing 38 that is always in direct contact with the collar 22. Thus the springs 37 acting on the plate 36 will in turn normally urge the disk 21 and associated parts to the right in Figure 2.

For operating the fork 23 to place the shaft 10 in driving engagement with the cathead 14 there is pivotally mounted on a bracket 39 a dog or wedge member 40 one end of which is adapted to engage the lower end of the fork 23. A foot lever 41 is disposed substantially diagonal to the axis of the dog 40 and adjacent one end is pivotally mounted as at 42. At its pivoted end the lever 41 is notched as at 43, to engage the dog 40 in a manner clearly shown in Figures 2 and 5 so that when the foot is placed on the lever 41 and the latter is depressed dog 40 will be forced to rotate in a clockwise direction thus causing the fork 23 to rotate in a counterclockwise direction to shift the disk 21 toward the left in Figure 2 to thereby, through the medium of the disks 17, 18 and 19 place the cathead 14 in driving engagement with the shaft 10. It will be apparent that the cathead 14 will remain in driving engagement with the shaft 10 as long as the foot is applied to the lever 14.

From the above it will be apparent that in the event for example, the hands of the operator become fouled in the cable the foot of the operator will be jerked off the pedal 41. Springs 37 will then act on the plate 36 to move the same together with collar 22 and associated disk 21 toward the right in Figure 2. Movement of the disk 21 in this direction will crowd the brake disk 34 against the brake disk 35, and the latter disk against the wall 31 of the fixed drum 25. As a result, disk 35 being engaged with the cathead a braking action will be applied to the cathead to prevent rotation of the latter while at the same time the drive connection between the shaft 10 and the cathead 14 will be interrupted. The cathead 14 being thus brought to a stop the possibility of serious injury to the operator will be reduced to a minimum.

In connection with the above it will be apparent that movement of the plate 36 to the right in Figure 2 under action of spring 37 as just explained, will result in a rocking of the fork 23 in a clockwise direction which in turn will cause the dog 40 to rock in a counter-clockwise direction, and this dog engaging the notched end 43 of the lever 41 will depress said end of the lever thus returning the lever 41 to the raised position shown in Figure 2.

Having thus described the invention what is claimed as new is:

1. In a load handling apparatus having a power shaft and a cathead loosely mounted thereon, clutch mechanism for placing said shaft into and out of driving engagement with the cathead and including a fixed clutch disk rotatable with the shaft, a shiftable clutch disk rotatable with the shaft, and an intermediate shiftable clutch disk rotatable with the cathead adapted to be clamped between the first and second disks for placing the shaft in driving engagement with the cathead; and brake mechanism for stopping the cathead incidental to a release of the intermediate disk, said brake mechanism including an actuator disk arranged at the side of the second disk opposite to said intermediate disk, said brake means further including a fixed brake drum having an integral wall presenting a brake surface on one side thereof, an annular member secured to said wall of the brake drum at the brake surface side thereof, a non-rotating brake disk mounted on the annular member to shift axially thereof, and a rotatable and axially movable brake disk carried by the cathead and located between said non-rotating brake disk and the brake drum wall to be frictionally engaged therewith to apply a braking action to the cathead when the actuator disk is shifted to release the disks of the clutch mechanism.

2. A control mechanism common to the clutch and brake mechanism of a cathead, and comprising a normally elevated pivoted foot pedal, a pivoted shifting fork, and a pivotally mounted dog having one end freely engaging said shifting fork, and a second end freely engaging said pedal.

3. In a cathead, clutch and brake mechanisms therefor, a pivoted shifting fork common to said mechanisms, a pivoted foot pedal, and a pivotally mounted dog having an end freely and laterally engaging the shifting fork and a second end having free overlapping engagement with said pedal.

4. In a load handling apparatus including a cathead and clutch and brake mechanisms for the cathead, control mechanism common to said clutch and brake mechanisms and including a normally elevated pivoted foot pedal adapted to be depressed for engaging the clutch and to be elevated when the clutch is released and the brake is engaged, a shifting fork common to said clutch and brake mechanisms and a pivotally mounted dog having an end freely engaging the shifting fork and a second end freely engaging said pedal.

CLARK W. HUBERT.